United States Patent [19]

Berry et al.

[11] 4,178,257

[45] Dec. 11, 1979

[54] TIRE BAND PLY LUBRICANT POWDER

[75] Inventors: Daniel D. Berry, Bedford Hills; Richard V. Girardi, Mahopac, both of N.Y.

[73] Assignee: Union Carbide Corporation, New York, N.Y.

[21] Appl. No.: 883,821

[22] Filed: Mar. 6, 1978

[51] Int. Cl.$^2$ .................. C10M 3/44; C10M 7/48; C10M 3/04; C10M 7/02

[52] U.S. Cl. .................................. 252/21; 252/28; 252/34; 252/49.5

[58] Field of Search .............. 252/21, 28, 49.5, 33.6, 252/34

[56] References Cited

U.S. PATENT DOCUMENTS

| | | | |
|---|---|---|---|
| 3,341,454 | 9/1967 | Chor et al. | 252/21 |
| 3,713,851 | 1/1973 | Cekada | 252/28 |
| 3,872,038 | 3/1975 | Adams et al. | 106/38.23 |
| 3,905,823 | 9/1975 | Piskoti | 252/28 |
| 3,967,968 | 7/1976 | Stone et al. | 252/28 |
| 4,043,924 | 8/1977 | Traver | 252/21 |
| 4,066,560 | 1/1978 | Van Vleck et al. | 252/21 |
| 4,125,470 | 11/1978 | Fenton et al. | 252/27 |

FOREIGN PATENT DOCUMENTS 844507 1/1977 Belgium .
2609157 9/1976 Fed. Rep. of Germany .

OTHER PUBLICATIONS

"Preformulated Band-Ply Lubricants", by Johnson et al., No. 73, given before the American Chemical Society, Oct. 21-25, 1971.

*Primary Examiner*—Irving Vaughn
*Attorney, Agent, or Firm*—Reynold J. Finnegan

[57] ABSTRACT

Water soluble tire band ply lubricant powders comprising silicon fluids adsorbed on the surface of filler particles.

18 Claims, No Drawings

TIRE BAND PLY LUBRICANT POWDER

BACKGROUND OF THE INVENTION

This invention relates to a tire band ply lubricant composition of matter and more particularly to a water soluble tire band ply lubricant powder.

The use of a band ply lubricant, an essential component in the manufacture of tires, is well known in the art. In the manufacture of a tire the shaping is caused by inflating a rubber bag inside the green tire carcass to force the tire into shape against the mold and said bag must subsequently be released from the inside of the vulcanized tire without causing defects. To accomplish this a band ply lubricant or release, also sometimes referred to as a raw tire or green tire lubricant is applied to the tubeless liner or number one ply (i.e. band ply) of the raw or green tire. The band ply lubricant serves a number of useful functions. It not only reduces friction between the inside of the raw tire and bag and allows for optimum slip of the raw tire during the shaping process when the raw tire and curing bladder (or bag) are in friction with one another under steam or air pressure, but also serves to channel the trapped air and/or gases during high temperature/high pressure steam or water curing, resulting from the chemical reaction of vulcanization, and allows them to escape from between the highly pressurized bag and tire interface. Finally, at the termination of the vulcanization cycle the essential function of the applied band ply lubricant is to allow for the final release and removal of the bag from inside the tire at a friction level of the lowest possible order.

In recent years solvent based band ply lubricants have in general given way to aqueous systems in order to avoid such problems as heat stability, air pollution, and the like, that may be attendant to the use of hydrocarbon solvents. However, aqueous based band ply lubricant systems are not without their own disadvantages. For example, entirely preformulated aqueous systems may not afford the tire manufacturer with any processing latitude with regard to making different types of tires and also possess the obvious drawbacks that accompany the handling of large amounts of liquid such as the need for a large storage area and the need for specific transportation equipment. Moreover entirely preformulated systems are, in general, aqueous emulsions and may also experience stability problems in the areas of ingredient settling, compaction and/or degradation during storage and/or transportation or upon inordinent temperature changes such as freeze-thaw cycles that might be encountered during same.

Such disadvantages of entirely preformulated aqueous band ply lubricants may be overcome or at least minimized by supplying the tire manufacturer with a liquid lubricant concentrate to which the manufacturer may then add filler and water to prepare his own end-use aqueous band ply lubricant or by supplying the tire manufacturer with a filler/liquid lubricant concentrate mud to which the tire manufacturer need only add water to obtain the end-use aqueous band ply lubricant. However, boh such methods can not be considered entirely satisfactory due to the burden they place on the tire manufacturer. For example, the use of liquid lubricant concentrates requires the tire manufacturer to handle large amounts of filler, generally mica, which due to its dustiness can cause unacceptable environmental problems in the plant of the tire manufacturer, while the filler/liquid concentrate muds have a handling disadvantage in that they are non-flowable semi-solids which appear to lead to aqueous emulsions when dispersed in water. Moreover, such lubricants concentrates require, when mixed with a filler and water, the use of specialized high-shear mixing equipment (e.g. a Cowles Mixer of the like) in order to produce the desired homogeneously mixed end-use aqueous band ply lubricant composition. The filler/liquid concentrate muds have a handling disadvantage in that they are non-flowable.

Applicant has now discovered a water soluble tire band ply lubricant powder which can be readily and simply dispersed in water to form an efficient and economical aqueous band ply lubricant composition for use by tire manufacturers.

Thus, it is an object of this invention to provide a tire band ply lubricant powder which is particularly useful for providing formulated aqueous solutions of said powder for employment by tire manufacturers. Other objects and advantages of this invention will become readily apparent from the following description and appended claims.

More specifically this invention may be described as a water soluble tire band ply lubricant powder consisting of, based upon 100 parts by weight of said powder (A) from about 63 to about 85.45 parts by weight of an inorganic filler selected from the class consisting of mica particles and a mixture of mica and talc or silicate particles, said mixture containing up to 10 parts by weight of talc or silicate particles the remainder being mica particles, and containing adsorbed on the surface of said filler.

(B) from about 5 to about 14 parts by weight of a water soluble polyoxyalkylene glycol.

(C) from about 2 to about 6 parts by weight of an organopolysiloxane-polyoxyalkylene copolymer fluid having the average formula

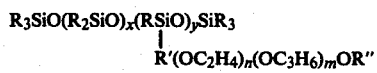

wherein R represents a monovalent hydrocarbon radical having from 1 to 10 carbon atoms, R' represents a divalent alkylene radical having from 2 to 18 carbon atoms, R" represents a monovalent hydrocarbon radical having from 1 to 6 carbon atoms, x has a value of 1 to 300, y has a value of 1 to 25, n has a value of 3 to 50, and m has a value of 3 to 50, said siloxane copolymer having an average molecular weight of about 600 to about 100,000, (D) from about 7 to about 15 parts by weight of a trihydrocarbonsiloxy end-blocked dihydrocarbon siloxane fluid having a viscosity at about 25° C. of from about 200 to about 100,000 centistokes, (E) from about 0.10 to about 0.35 parts by weight of a nonionic organo substituted cellulosic viscosity controller, (F) from about 0.10 to about 0.45 parts by weight of an organic anti-bacterial agent; and (G) from about 0.35 to about 1.2 parts by weight of the aqueous reaction product of an admixture consisting of (i) from about 0.10 to about 0.20 parts by weight of an organosubstituted benzoic acid, (ii) from about 0.15 to about 0.2 parts by weight of an organic amine, and (iii) from about 0.10 to about 0.80 parts by weight of water.

DESCRIPTION OF THE PREFERRED EMBODIMENTS

The inorganic filler employed in this invention includes mica particles and mixtures of mica and talc or silicate particles. Said filler particles are conventional particulate materials that are well known to the art and serve as the carrier for the remaining ingredients of this invention by adsorbing said ingredients on their surface thereby providing the water soluble tire band ply lubricant powder of this invention. Said filler particles also provide channels between the raw tire and the bag interface through which trapped air and/or gases, can escape during the manufacture of the tire. As seen above, the inorganic filler is the major ingredient of the powder of this invention and that said powder can consist of from about 63 to about 85.45 parts by weight of mica particles or a mixture of mica and talc or silicate particles wherein said mixture can contain up to 10 parts by weight of talc or silicate particles the remainder being mica particles based upon 100 parts by weight of said powder. Preferably the inorganic filler consists solely of mica particles which in general may have a particle size ranging from about 100 to about 600 mesh and more preferably from about 150 to 350 mesh.

The water soluble polyoxyalkylene glycol ingredient of this invention can be either a homopolymer of ethylene glycol or a copolymer of ethylene and propylene glycol having average molecular weights ranging from about 250 to about 90,000. Such polyoxyalkylene glycols as well as methods for their preparation are well known and are commonly prepared by polymerizing ethylene glycol with ethylene oxide, or propylene glycol with propylene oxide, or copolymerizing either glycol with ethylene and propylene oxides in sequence or mixtures of both oxides, with or without a different mono or polyhydric initiator to form the desired polymer. Of course, it is to be understood that mixtures of the various types of polyoxyalkylene glycols can be employed in this invention, if desired. Preferably the polyoxyalkylene glycol is a polyoxyethylene/polyoxypropylene copolymer having an average molecular weight of about 600 to about 4,000 and wherein the oxyalkylene chain consists of about 25 to about 50 percent by weight of oxyethylene groups and about 75 to about 50 percent by weight of oxypropylene groups and more preferably consists of a butanol started copolymer containing about 50 percent by weight of oxyethylene groups and about 50 percent by weight of oxypropylene groups. As seen above, the amount of polyoxyalkylene glycol ingredient in the powder of this invention can range from about 5 to about 14 parts by weight based upon 100 parts by weight of said powder.

The trihydrocarbonsiloxy end-blocked dihydrocarbon siloxane fluids which are employed in this invention are those having a viscosity of about 200 to about 100,000 centistokes, more preferably about 350 to 60,000 centistokes, at 25° C. Such siloxane fluids along with the polyoxyalkylene glycol ingredient function as the major lubricity agents of this invention. Of course, it is understood that mixtures of two or more such siloxane fluids having different viscosities can be employed if desired. While such types of siloxane fluids are well known in the art the most preferred siloxane for use in this invention is trimethylsiloxy end-blocked dimethylsiloxane. As seen above, the amount of trihydrocarbonsiloxy end-blocked dihydrocarbonsiloxane fluid in the powder of this invention can range from about 7 to about 15 parts by weight based upon 100 parts by weight of said powder.

Because of the inherent incompatibility of the polyoxyalkylene glycol and trihydrocarbonsiloxy end-blocked dihydrocarbon siloxane ingredients of this invention a compatibilizing agent is required to prevent said ingredients from forming a two phase solution as they normally do when mixed together per se or in an aqueous solution. Such a function is provided by the organopolysiloxane-polyoxyalkylene copolymer fluids employed in this invention which can be represented by the average formula

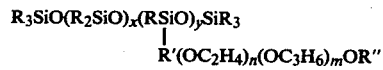

$$R_3SiO(R_2SiO)_x(RSiO)_ySiR_3$$
$$|$$
$$R'(OC_2H_4)_n(OC_3H_6)_mOR''$$

wherein R represents a monovalent hydrocarbon radical having from 1 to 10 carbon atoms, wherein R' represents a divalent alkylene radical having from 2 to 18 carbon atoms, wherein R'' represents a monovalent hydrocarbon radical having from 1 to 6 carbon atoms, wherein x has a value of 1 to 300, y has a value of 1 to 25, n has a value of 3 to 50 and m has a value of 3 to 50, with the proviso that at least 10 percent by weight of the polyoxyalkylene chain consists of oxypropylene units, and wherein said siloxane copolymer fluid has an average molecular weight of about 600 to about 100,000.

Illustrative examples of such monovalent hydrocarbon radicals represented by R include alkyl radicals both straight and branched chain alkyl radicals such as methyl, ethyl, propyl, butyl, 2-ethyl hexyl, decyl and the like, as well as cyclohexyl and aryl radicals such as phenyl and the like. While it is to be understood that each R radical can be the same or different or even carry substituent groups so long as they do not adversely affect the compatibilizing function of the polysiloxane-polyoxyalkylene copolymers, preferably R represents a methyl radical.

Illustrative examples of such divalent alkylene bridging groups represented by R' include both straight and branched chain alkylene groups such as ethylene, propylene, isopropylene, octadecylene, and the like. While each of said divalent alkylene groups may be the same or different, preferably R' is selected from the class consisting of —$C_2H_4$— and —$C_3H_6$—, and most preferably is —$C_3H_6$—.

Illustrative examples of such monovalent hydrocarbon radicals represented by R'' include alkyl radicals such as methyl, ethyl, butyl, hexyl, and the like. Preferably, R'' is a methyl radical, although such end-blocking groups represented by R'' may be the same or different if desired.

The organopolysiloxane-polyoxyalkylene copolymers and/or methods for their manufacture are well known in the art. Said copolymers are non-hydrolyzable homogeneous fluids. Of course, it is to be understood that the dihydrocarbon siloxy units, the polyoxyalkylene containing siloxy units, as well as the oxyethylene and oxypropylene units of the polyoxyalkylene substituent of said copolymer may be distributed in the copolymer, randomly, alternately as subblocks of repeating units of the same type, or in any combination of such arrangements. Further, although the siloxane copolymers employed herein can be discrete chemical compounds they are usually mixtures of discrete siloxane species which differ in molecular weight and in the type arrangement and relative proportions of units. Therefore, as expressed herein, the parameters employed to denote the relative proportions of units (e.g., x and y) are average values and are based on the relative proportions of reactants from which the respective units are derived. It is to be further understood that consistent with convention in the art of defining organopolysiloxane-polyoxyalkylene copolymers the formula of said copolymers indicates their overall average emperical composition rather than any particular ordered arrangement of units or molecular weight of any particular discrete siloxane species.

More preferably the organopolysiloxane-polyoxyalkylene copolymers employed herein are those having a molecular weight of about 5,000 to 40,000 and wherein x has a value of 50 to 200, y has a value of 3 to 20, n has a value of 10 to 40 and m has a value of 10 to 40.

As pointed out above, the amount of organopolysiloxane-polyoxyalkylene copolymer compatibilizing agent employed in the powder of this invention can range from about 2 to about 6 parts by weight based upon 100 parts by weight of said powder.

The nonionic organo substituted cellulosic viscosity controller employed in this invention can be selected from the class consisting of methyl cellulose, carboxyethyl cellulose, carboxypropyl cellulose and hydroxyethyl cellulose. Such cellulosic materials are well known compounds and can be employed to control the lubricant viscosity of the powder in the end-use aqueous solutions of the powder of this invention. The preferred viscosity controller is hydroxyethyl cellulose. As pointed out above, the amount of the nonionic organo substituted cellulosic viscosity controller employed in the powder of this invention can range from about 0.10 to about 0.35 parts by weight based upon 100 parts by weight of said powder.

An organic anti-bacterial agent is employed in this invention to prevent and/or minimize bacterial attack of the oxygen containing ingredients in both the powder and its end use aqueous solutions of this invention. Such types of agents are well known and include formaldehyde, substituted dioxanes, such as 6-acetoxy-2,4-dimethyl-m-dioxane, and the like and organic substituted quaternary ammonium halide monohydrate biostats such as diisobutyl phenoxy ethoxy ethyl dimethyl benzyl ammonium chloride monohydrate, diisobutyl cresoxy ethoxy ethyl dimethyl benzyl ammonium chloride monohydrate, and the like. Preferably said antibacterial agents are employed in the form of aqueous solutions and the more preferred agents are the organic substituted quaternary ammonium halide monohydrate biostats, especially a 50 percent by weight solution of diisobutyl phenoxy ethoxy ethyl dimethyl benzyl ammonium chloride monohydrate. As pointed out above, the amount of anti-bacterial agent, whether in its diluted or undiluted form, in the powder of this invention can range from about 0.1 to about 0.45 parts by weight based upon 100 parts by weight of said powder.

The remaining ingredient of the powder of this invention is the aqueous reaction product of an admixture consisting of (i) from about 0.10 to about 0.20 parts by weight of an organosubstituted benzoic acid, (ii) from about 0.15 to about 0.20 parts by weight of an organic amine, and (iii) from about 0.10 to about 0.80 parts by weight of water. The aqueous reaction product of said admixture which is the solubilized amine salt of the benzoic acid can be easily prepared by merely mixing the benzoic acid and amine compound together in the presence of the water and serves as both a liquid and vapor phase corrosion inhibitor to help protect the mild steel components commonly employed in the spray pumping systems used in tire manufacturing. Illustrative examples of such organo-substituted benzoic acids include p-nitrobenzoic acid and more preferably alkyl substituted benozic acids wherein the alkyl radical may have from 2 to 10 carbon atoms, especially p-tertiary-butyl benzoic acid. Illustrative examples of such organic amines may include hydroxy containing alkyl primary, secondary and tertiary amines having a molecular weight of about 50 to about 100, preferably monohydroxy substituted alkyl primary amines wherein said alkyl radical contains from 2 to 4 carbon atoms, especially monoethanol amine ($H_2NC_2H_4OH$). It is important to note that said aqueous reaction product of the benzoic acid and the organic amine requires preforming the aqueous admixture of the benzoic acid and the organic amine prior to its use in this invention in order to discretely adsorb the ingredients on the surface of the filler particles of the powder of this invention. As pointed out above, the amount of said aqueous reaction product of the admixture of said benzoic acid, organic amine and water employed in the powder of this invention can range from about 0.35 parts to about 1.2 parts by weight based upon 100 parts by weight of said powder.

Of course, it is to be understood that while the lubricant powders of this invention are generally prepared using a single type of each of ingredients (A) to (G) discussed above, any given lubricant powder of this invention can contain, if desired, mixtures of one or more of the different types of any of said ingredients or any possible combinations thereof.

The tire band ply lubricant powder of the invention can be easily prepared by mixing or blending the ingredients of said powder in any order desired in a low shear mixer, such as a ribbon blender, planetary mixer, or the like, until total wetting out of the filler is observed by the absence of uncoated filler and/or liquid ingredients in the mix, the liquid species having been adsorbed on the surface of the filler to form a discrete flowable powder. For instance, the liquid ingredients can be added directly to (or if desired atomized onto) the filler in any order desired, the larger volume ingredients normally being incrementally added first. In general, it is preferred to first form a mixture of all the liquid ingredients and then add said liquid mixture either directly (or by atomization) to the filler in order to effect the most optimum surface contact and even distribution of the liquid ingredients on the surface of the filler.

Accordingly, the tire band ply lubricant powders of this invention are themselves made up of discrete flowable particles wherein the liquid ingredients have been uniformly adsorbed on the surface of the filler particles. Said powders have excellent physical stability, they are resistant to compaction and will remain flowable even when shipped and/or stored over long periods of time. Moreover, the lubricant powders of this invention constitute a unique technological advancement in the art in that the tire manufacturer need not, for the first time, burden himself with (a) large quantities of fully formulated aqueous or emulsified lubricants or (b) liquid concentrates that require special in-house handling of the filler and rigorous formulation conditions and techniques (e.g. high shear mixing), or (c) the use of cumbersome non-flowable mud concentrates, since said powders of this invention can be easily converted by the tire manufacturer to fully formulated tire band ply lubricant solutions merely by the addition of the powder to water under conventional low shear mixing techniques, such as the use of a Lightnin mixer or the like. Thus, said powders of this invention allow the tire manufacturer to (a) forego the handling of dusty fillers such as mica, (b) easily formulate non-emulsified aqueous tire band ply lubricant solutions at the green tire spraying station with no need of special cement house preparation and in-house transporation of the finished lubricant solution, and (c) to easily control the various viscosity, air-bleed, slip and release properties of the formulated lubricant solution merely by adjustment of the powder/water ratio so as to accommodate the wide variety of tire constructions, e.g. bias and radial passenger and truck tires, types of curing bags and press requirements, and the like, demanded by tire plant production sequences.

Thus, this invention is also directed to a process for preparing aqueous solutions of the lubricant powders of this invention, which solutions can be employed by the tire manufacturer in the conventional manner to give excellent release of the bag from the tire during its production. As pointed out above, said aqueous solutions of the tire band ply lubricant powders of this invention can be conveniently prepared merely by adding the flowable powder product of this invention, generally in incremental amounts, to water and low shear mixing (i.e. simple stirring or blending e.g. in a Lightnin mixer, or the like) until a smooth and uniform product solution is obtained, the whole procedure normally being completed within thirty minutes. The amount of water and powder employed is not narrowly critical and merely depends on the end viscosity of the aqueous solution desired by the tire manufacturer as dictated by his tire production conditions and requirements. In general, the amount ratio of water to powder in said aqueous solutions may range from about 30 to about 60 parts by weight of water to about 40 to about 70 parts by weight of powder, while solutions of about 50 parts by weight of water to about 50 parts by weight of powder should be suitable for most purposes. Thus, the formulated aqueous solutions of the lubricant powders of this invention provide the tire manufacturer with an excellent lubricant-air bleed-release medium for use in the production of tires. Said solutions are pseudoplastic in nature, they have excellent stability against separation and compaction on standing, yet are easily flowable, pumpable and sprayable, and which when sprayed on the inside of the raw or green tire will give a smooth, uniform, non-running, non-splattering and non-puddling coating from bead to bead. Moreover, they are protected against bacterial attack and from causing corrosion problems, and because of their hydrophilic nature, spills and oversprays during use can be readily cleaned up with water.

The following examples are illustrative of the present invention and are not to be regarded as limitative. It is to be understood that all parts, percentages and proportions referred to herein and in the appended claims are by weight unless otherwise indicated.

EXAMPLE 1

A tire band ply lubricant powder was prepared by adding, in the order listed, to about 70 parts by weight of 325 mesh water ground mica in a ribbon blender, (a) about 10.32 parts by weight of a water soluble butanol started polyoxyalkylene glycol copolymer having an average molecular weight of about 1700 and consisting of about 50 percent by weight of oxyethylene groups and 50 percent by weight of oxypropylene groups, (b) about 4.98 parts by weight of an organopolysiloxane-polyoxyalkylene copolymer fluid having the average formula:

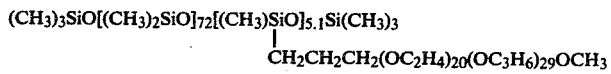

(c) about 13.50 parts by weight of a trimethylsiloxy end-blocked dimethylsiloxane fluid having a viscosity at 25° C. of about 10,000 centistokes, (d) about 0.24 parts by weight of hydroxyethyl cellulose, (e) about 0.30 parts by weight of a 50 percent by weight aqueous solution of diisobutyl phenoxy ethoxy ethyl dimethyl benzyl ammonium chloride monohydrate, and (f) about 0.66 parts by weight of the aqueous reaction product of an admixture consisting of (i) about 0.15 parts by weight of p-tertiary butyl benzoic acid, (ii) about 0.18 parts by weight of monoethanolamine, and (iii) about 0.33 parts by weight of water, and the entire mixture blended for about 20 minutes until total wetting out of the mica was observed and a gray discrete flowable powder was obtained. Said powder was found to have a density of about 55 pounds per cubic foot, a specific gravity of about 2.29 and a flash point (ASTM D-93, Pensky-Martin Closed Cup) of greater than 475° F. Moreover, said powder was found to remain flowable and was easily mixed with water to form a non-agglomerated aqueous solution of the powder even after having been left standing for five months.

EXAMPLE 2

The same gray discrete flowable powder product as described in Example 1 was prepared using the same ingredients and amount ratios except this time a preformulated liquid mixture of all of the liquid ingredients, i.e. (a) the polyoxyalkylene glycol, (b) the organopolysiloxane-polyoxyalkylene copolymer fluid, (c) the trimethylsiloxy end-blocked dimethylsiloxane fluid, (d) the hydroxyethyl cellulose, (e) the aqueous solution of diisobutyl phenoxy ethoxy ethyl dimethyl benzyl ammonium chloride monohydrate, and (f) the aqueous reaction product of said aqueous benzoic acid-amine admixture were added incrementally to the mica particles in a ribbon blender until total wetting out of the mica was observed. The powder product of this Example was also found to remain flowable and easily mixable with water to form a non-agglomerated aqueous solution of the powder after having been left standing for five months.

EXAMPLES 3 TO 6

A series of four formulated aqueous tire band ply lubricant solutions were prepared by incrementally blending the gray discrete lubricant powder product as described and prepared in Example 1 with varying amounts of water, utilizing a low shear mixer. Each procedure was completed in about twenty minutes and in each instance there was obtained a smooth uniform grayish aqueous solution of the powder which was free of agglomerates. Solution A consisted of about 60 parts by weight of lubricant powder and about 40 parts by weight of water and had a Brookfield viscosity (10 R.P.M.) at 25° C. of about 29,000 centipoises. Solution B consisted of about 55 parts by weight of lubricant powder and about 45 parts by weight of water and had a Brookfield viscosity (10 R.P.M.) at 25° C. of about 17,000 centipoises. Solution C consisted of about 50 parts by weight of the lubricant powder and about 50 parts by weight of water and had a Brookfield viscosity (10 R.P.M.) at 25° C. of about 4000 and a density at 25° C. of about 1.4 grams per milliliter (about 11.6 pounds per gallon). Solution D consisted of about 48 parts by weight of the lubricant powder and about 52 parts by weight of water and had a Brookfield viscosity (10 R.P.M.) of about 1500 centipoises. Each aqueous solution product exhibited excellent stability against separation in that no supernate layer was observed even upon standing for at least a week. Each solution is pumpable and sprayable and can be employed by the tire manufacturer to spray the inside of a raw tire to result in a smooth and uniform coating of the solution which when dry will impart excellent slip and channeling of trapped air between the interface of the inside of the raw tire and the bag during the shaping process and excellent release of the tire/bag interface upon completion of the vulcanization cycle employed in the manufacture of tires.

In contrast an aqueous lubricant solution consisting of about 50 parts by weight of water and about 50 parts by weight of a lubricant powder prepared in the same manner as described in Example 1 using the same ingredients and amount ratios save for omitting the organopolysiloxane-polyoxyalkylene copolymer compatibilizing ingredient was prepared. Said prepared solution was completely unstable as evidenced by the immediate separation of the liquid polyoxyalkylene glycol copolymer and dimethylsiloxane fluid ingredients into two distinct separate layers rendering the solution unsuitable as a tire band ply lubricant.

EXAMPLE 7

A bag having a 35 square inch surface area (5"×7") was filled with the gray discrete lubricant powder product of Example 2 and subjected to a compaction force of about 0.83 pounds per square inch of pressure for six days. The bag was then split opened and the powder poured into a beaker containing sufficient water to make up a 50:50 percent by weight water/powder solution and stirred utilizing a low shear mixer, for about twenty minutes. There was obtained a smooth uniform grayish aqueous solution of the powder which was free of agglomerates. This test demonstrates that the lubricant powder of this invention is highly resistent to compaction and that even after having been subjected to such compaction forces as might be encountered during shipping is still easily converted to a formulated aqueous solution by simple mixing.

Various modifications and variations of this invention will be obvious to a worker skilled in the art and it is to be understood that such modifications and variations are to be included within the purview of this application and the spirit and scope of the appended claims.

What is claimed is:

1. A water soluble tire band ply lubricant powder consisting of, based upon 100 parts by weight of said powder, (A) from about 63 to about 85.45 parts by weight of an inorganic filler selected from the class consisting of mica particles and a mixture of mica and talc particles, said mixture containing up to 10 parts by weight of talc particles the remainder being mica particles, and containing adsorbed on the surface of said filler, (B) from about 5 to about 14 parts by weight of a water soluble polyoxyalkylene glycol,
(C) from about 2 to about 6 parts by weight of an organopolysiloxane-polyoxyalkylene copolymer fluid having the average formula:

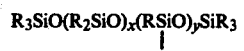

wherein R represents a monovalent hydrocarbon radical having from 1 to 10 carbon atoms, R' represents a divalent alkylene radical having from 2 to 18 carbon atoms, R" represents a monovalent hydrocarbon radical having from 1 to 6 carbon atoms, x has a value of 1 to 300, y has a value of 1 to 25, n has a value of 3 to 50, and m has a value of 3 to 50, with the proviso that at least 10 percent by weight of the polyoxyalkylene chain consists of oxypropylene units, and wherein said siloxane copolymer has an average molecular weight of about 600 to about 100,000, (D) from about 7 to about 15 parts by weight of a trihydrocarbonsiloxy end-blocked dihydrocarbon siloxane fluid having a viscosity at about 25° C. of from about 200 to about 100,000 centistokes,
(E) from about 0.10 to about 0.35 parts by weight of a nonionic organo substituted cellulosic viscosity controller,
(F) from about 0.10 to about 0.45 parts by weight of an organic anti-bacterial agent, and
(G) from about 0.35 to about 1.2 parts by weight of the aqueous reaction product of an admixture consisting of (i) from about 0.10 to about 0.20 parts by weight of an organosubstituted benzoic acid, (ii) from about 0.15 to about 0.2 parts by weight of an organic amine, and (iii) from about 0.10 to about 0.80 parts by weight of water.

2. A powder as defined in claim 1, wherein the filler is mica.

3. A powder as defined in claim 2, wherein the polyoxyalkylene glycol is a polyoxyethylene/polyoxypropylene copolymer having an average molecular weight of about 600 to about 4,000 and wherein the oxyalkylene chain consists of about 25 to about 50 percent by weight of oxyethylene groups and about 75 to about 50 percent by weight of oxypropylene groups.

4. A powder as defined in claim 3, wherein the oxyalkylene chain of the polyoxyethylene/polyoxypropylene copolymer consists essentially of about 50 percent by weight of oxyethylene groups and about 50 percent by weight of oxypropylene groups.

5. A powder as defined in claim 2, wherein the dihydrocarbon siloxane fluid is a trimethylsiloxy end-blocked dimethylsiloxane fluid having a viscosity at 25° C. of about 350 to about 60,000 centistokes.

6. A powder as defined in claim 2, wherein R is a methyl radical, R' is a divalent propylene radical, R" is an alkyl radical, x has a value of 50 to 200, y has a value of 3 to 20, n has a value of 10 to 40, m has a value of 10 to 40 and wherein the organopolysiloxane-polyoxyalkylene copolymer has a molecular weight of about 5,000 to about 40,000.

7. A powder as defined in claim 2, wherein the organo substituted cellulosic viscosity controller is selected from the class consisting of methyl cellulose, carboxyethyl cellulose, carboxypropyl cellulose and hydroxyethyl cellulose.

8. A powder as defined in claim 7, wherein the cellulosic viscosity controller is hydroxyethyl cellulose.

9. A powder as defined in claim 2, wherein the antibacterial agent is a 50 percent by weight aqueous solution of diisobutyl phenoxy ethoxy ethyl dimethyl benzyl ammonium chloride monohydrate.

10. A powder as defined in claim 2, wherein the benzoic acid is p-tertiary butyl benzoic acid and the organic amine is monoethanol amine.

11. A powder as defined in claim 3, wherein the dihydrocarbon siloxane fluid is a trimethylsiloxy end-blocked dimethylsiloxane fluid having a viscosity at 25° C. of about 350 to about 60,000 centistokes, wherein the organopolysiloxane-polyoxyalkylene copolymer has a molecular weight of about 5,000 to about 40,000 and R is a methyl radical, R' is a divalent propylene radical, R" is an alkyl radical, x has a value of 50 to 200, y has a value of 3 to 20, n has a value of 10 to 40 and m has a value of 10 to 40, wherein the cellulosic viscosity controller is hydroxyethylcellulose, wherein the anti-bacterial agent is a 50 percent by weight aqueous solution of diisobutyl phenoxy ethoxy ethyl dimethyl benzyl ammonium chloride monohydrate, wherein the benzoic acid is p-teritary butyl benzoic acid and wherein the organic amine is monoethanol amine.

12. A powder as defined in claim 11, wherein the oxyalkylene chain of the polyoxyethylene/polyoxypropylene copolymer consists essentially of about 50 percent by weight of oxyethylene groups and about 50 percent by weight of oxypropylene groups, and wherein R" is a methyl radical.

13. A powder as defined in claim 12, wherein the polyoxyethylene/polyoxypropylene copolymer is butanol started and has an average molecular weight of about 1700, wherein the trimethylsiloxy endblocked dimethyl siloxane fluid has a viscosity at 25° C. of about 10,000 centistokes, and wherein the organopolysiloxane-polyoxyalkylene copolymer has the average formula

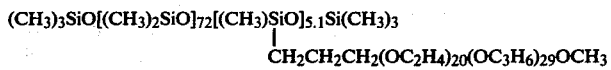

14. A powder as defined in claim 13, consisting of (a) about 70 parts by weight of the mica particles, (b) about 10.32 parts by weight of the polyoxyethylene/polyoxypropylene copolymer (c) about 4.98 parts by weight of the organopolysiloxane-polyoxyalkylene copolymer, (d) about 13.50 parts by weight of the trimethylsiloxy end-blocked dimethylsiloxane fluid, (e) about 0.24 parts by weight of the hydroxyethylcellulose, (f) about 0.30 parts by weight of the 50 percent by weight aqueous solution of diisobutyl phenoxy ethoxy ethyl dimethyl benzyl ammonium chloride monohydrate and (g) about 0.66 parts by weight of the aqueous reaction product of an admixture of (i) about 0.15 parts by weight of p-tertiary butyl benzoic acid, (ii) about 0.18 parts by weight of monoethanol amine, and (iii) about 0.33 parts by weight of water.

15. A process for preparing an aqueous tire band ply lubricant solution consisting of about 30 to about 60 parts by weight of water and about 70 to about 40 parts by weight of the lubricant powder as defined in claim 1, which comprises low shear mixing of said powder in water.

16. A process for preparing an aqueous tire band ply lubricant solution consisting of about 30 to about 60 parts by weight of water and 70 to about 40 parts by weight of the lubricant powder as defined in claim 11, which comprises low shear mixing of said powder in water.

17. A process for preparing an aqueous tire band ply lubricant solution consisting of about 30 to about 60 parts by weight of water and about 70 to about 40 parts by weight of the lubricant powder as defined in claim 13, which comprises low shear mixing of said powder in water.

18. A process for preparing an aqueous tire band ply lubricant solution consisting of about 50 parts by weight of water and about 50 parts by weight of the lubricant powder as defined in claim 14, which comprises low shear mixing of said powder in water.

* * * * *